3,280,221
HYDRAZINIUM HYDROCARBONTHIO-
PHOSPHONATE SALTS
Herbert S. Skovronek, Morris Plains, N.J., assignor to
Texaco Inc., New York, N.Y., a corporation of Delaware
No Drawing. Filed May 14, 1963, Ser. No. 280,430
5 Claims. (Cl. 260—923)

The subject application pertains to novel reaction products of hydrazine and hydrocarbonthiophosphonic acids. More particularly, this invention is directed to hydrazinium hydrocarbonthionphosphonates and their method of manufacture.

The novel hydrazinium hydrocarbonthiophosphonates are useful as detergent-dispersant additives in lubricating oil.

The hydrazinium hydrocarbonthiophosphonates are represented by the formula:

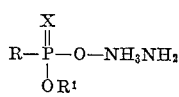

where R is a hydrocarbon derived monovalent radical, $R_1$ is a member selected from the group consisting of hydrogoen and saturated aliphatic radical (alkyl) of from 1 to 10 carbons and X is a chalogen selected from the group consisting of sulfur and a mixture of sulfur and oxygen. In this invention when X is defined as a mixture of sulfur and oxygen a mixture of hydrazinium hydrocarbonthiophosphonate and hydrazinium hydrocarbonphosphonate is intended. Therefore, within the definition of hydrazinium hydrocarbonthiophosphonate I include mixtures of the thiophosphonate and the phosphonate.

The hydrazinium hydrocarbonthiophosphonates of the invention are prepared by reacting hydrocarbonthiophosphonic acid or O-alkyl hydrocarbonthiophosphonic acid with hydrazine. With the definition of hydrazine I include the hydrous as well as the anhydrous forms thereof.

The hydrocarbonthiophosphonic acid and alkyl ester reactants are derived from a hydrocarbon-$P_2S_5$ reaction product. The hydrocarbon-$P_2S_5$ reaction product is prepared by reacting aromatic hydrocarbon, cycloaliphatic hydrocarbons and aliphatic hydrocarbons with $P_2S_5$ at elevated temperature. Although a wide variety of hydrocarbons can be employed, olefins are generally used.. Lubricating oil fractions and cracked hydrocarbon fractions constitute other preferred classes of materials for reaction with $P_2S_5$.

The olefinic hydrocarbons reacted with $P_2S_5$ usually contain at least 12 carbon atoms although lower molecular olefins can be employed. Polymers of an alkene such as polybutene (polyisobutylene, polybutylene), polypropene (polypropylene, polyisopropylene) and copolymers of olefins such as propene-isobutene copolymer are preferred materials for reaction with $P_2S_5$. In general, olefin polymers and copolymers having an average molecular weight between 250 and 50,000 are employed with polymers and copolymers having an average molecular weight in the range of 600 to 5,000 being particularly preferred. An example of a preferred mono-olefin polymer is a polybutene polymer having an average molecular weight of 600 to 5,000. The polyalkene polymers are mono-olefinic in nature.

The $P_2S_5$ is reacted with the hydrocarbon ($P_2S_5$ constituting 5 to 40 percent of the reaction mixture) at a temperature of from about 100 to 320° C. in a non-oxidizing atmosphere (e.g., under a blanket of nitrogen) to form a hydrocarbon-$P_2S_5$ reaction product. The hydrocarbon-$P_2S_5$ reaction product is hydrolyzed at a temperature between about 100 to 260° C. by contact with steam. The steam hydrolyzes the hydrocarbon-$P_2S_5$ reaction product to hydrocarbonthiophosphonic acid and inorganic phosphorus acids. The hydrocarbonthiophosphonic acid has the general formula:

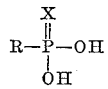

where R is a monovalent radical derived from the original charge hydrocarbon and is desirably a mono-olefinic radical (alkenyl) containing 20 to 200 carbon atoms, and X is sulfur or a mixture of sulfur and oxygen. X in the above formula is designated as sulfur or a mixture of sulfur and oxygen because the steam hydrolysis step usually results in the replacement with oxygen of a portion of the sulfur joined to the phosphorus.

The inorganic phosphorus acids formed during hydrolysis are removed prior to reaction of the thiophosphonic acid with hydrazine. A number of different procedures are available for removal of the inorganic phosphorus acids. U.S. Patent Nos. 2,951,835 and 2,987,512 disclose the removal of inorganic pohsphorus acids by contact with synthetic hydrous alkaline earth metal silicates and sythetic hydrous alkali metal silicates, respectively. Commonly assigned, copending application Serial No. 841,-668, filed September 23, 1959, now U.S. Patent No. 3,135,-729, by H. D. Kluge and R. G. Lacoste described a process wherein inorganic phosphorus acids are removed from the hydrolyzed product by extraction with anhydrous methanol.

The O-alkyl hydrocarbonthiophosphonic acid is prepared by reacting the aforedescribed hydrocarbonthiophosphonic acid with a trialkylphosphite at a temperature between about 100° C. and 250° C. The O-alkyl product formed is of the formula:

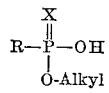

where R and X are as heretofore defined.

The hydrazinium hydrocarbonthiophosphonates are prepared by reacting hydrazine with hydrocarbonthiophosphonic acid or O-alkyl hydrocarbonthiophosphonic acid at a temperature between about 20 and 120° C. in a reactant mole ratio of hydrazine to thiophosphonic acid of between about 0.5:1 and 5:1. The reaction is conducted at atmospheric pressure, although superatmospheric and subatmospheric pressures may be employed. Under advantageous conditions inert organic diluent such as benzene, toluene, xylene, chloroform, carbon tetrachloride, diethyl ether, dipropyl ether and petroleum ether are utilized. The boiling point of the inert solvent should be above the temperature of the reaction, yet low enough to facilitate its removal when the reaction has been completed. At the end of the reaction period, the product may be purified by any standard means such as fractionation. One method of fractionation of the reactants and solvent if utilized is by stripping, e.g., with nitrogen under reduced pressure and elevated temperature, e.g., at less than 20 mm. Hg and above 90° C.

Specific examples of the hydrazinium hydrocarbonthiophosphonates contemplated herein are hydrazinium polybutene(2500 m.w.)thiophosphonate; hydrazinium polypentene(2500 m.w.)thiophosphonate; hydrazinium propene-butene copolymer(1500 m.w.)thiophosphonate; hydrazinium polypentene(5000 m.w.)thiophosphonate; hydrazinium O-methyl polybutene(1100 m.w.)thiophosphonate; and hydrazinium O-propyl polyisopropene(3000 m.w.)thiophosphonate.

The following examples further illustrate the invention but are not to be construed as limitations thereof.

*Example I*

A polybutene-$P_2S_5$ reaction product was prepared by reacting polybutene having an average molecular weight of about 1100 with $P_2S_5$ of 1.1:1 and in the presence of sulfur in an amount equal to 3 wt. percent of the polybutene. After continuing the reaction at 232° C. and until the reaction mixture is soluble in n-pentane, the reactant product was diluted with approximately 150 wt. percent of a naphthene base oil having an SUS viscosity of 100 at 100° F. The diluted product was steamed at 176° C. for 10 hours in a nitrogen atmosphere and then dried by passage of nitrogen therethrough at 176° C. The steamed product was extracted with an equal weight of methanol at 55° C. to give a methanol extract containing inorganic phosphorus acid and a lubricating oil raffinate containing polybutene (1100 m.w.) of the formula:

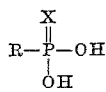

which after stripping free of methanol has a Neut. No. of 22.6 and where R is a polybutene radical of an average molecular weight of about 1100.

The theoretical wt. percent sulfur in a thiophosphonic acid of the formula:

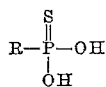

where R is as heretofore defined is 1.29. The actual sulfur found in the thiophosphonic acid product was 0.51 wt. percent indicating X is a mixture of sulfur and oxygen, i.e. the acid product was a mixture of thiophosphonic acid and phosphonic acid.

*Example II*

In a flask fitted with stirrer, condenser and thermocouple there was added 1400 grams of an oil raffiniate solution of the type prepared in Example I containing 0.5 mole polybutene(1100 m.w.)thiophosphonic acid and 70 g. (0.56 m.) trimethylphosphite. The reaction mixture was heated at 150° C. for 6 hours and then stripped at 100° C. under vacuum (aspirator). 1363 g. of product was obtained and identified as an oil solution of O-methyl polybutene(1100 m.w.)thiophosphonic acid of the formula:

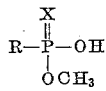

where R is a polybutene of 1100 m.w. and X is a mixture of sulfur and oxygen. Analysis of the oil solution found the following:

| Description | Calculated | Found |
| --- | --- | --- |
| Neut. No | 0 | 6 |
| Percent P | 1.1 | 1.2 |
| Percent S | ¹1 | 0.38 |

¹ Assuming X=100% sulfur.

*Example III*

An oil raffinite as prepared in Example I containing 0.5 mole of polybutene(1100 m.w.)thiophosphonic acid and 1000 milliliters of benzene were refluxed until the mixture was water-free. To the reaction mixture there was added 0.58 mole of hydrazine hydrate ($NH_2NH_2 \cdot H_2O$) and the resultant mixture was refluxed for 5 hours. Five hundred milliliters of benzene was then distilled off and replaced by 500 milliliters of xylene and the reaction mixture was heated to 140° C. The reaction mixture was then stripped to a maximum temperature of 130° C. at 0.3 mm. Hg. The resultant product was analyzed and found to be an oil solution containing a mixture of thiophosphonate and phosphonate of the formulas:

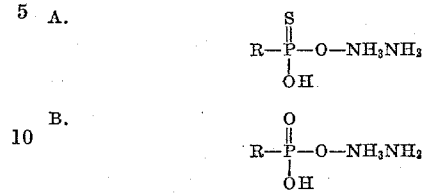

where R is a polybutene radical having an average molecular weight of about 1100 with Product A, above, predominating. The hydrazinium product solution analyzed as follows:

| Description | Calulated ¹ | Found |
| --- | --- | --- |
| Phosphorus, wt. percent | 1.1 | 1.09 |
| Sulfur, wt. percent | 1.0 | 0.48 |
| Nitrogen, wt. percent | 1.02 | 0.31 |
| Neut. No | | 20.2 |

¹ Based on the product being 100% Product A.

*Example IV*

In a flask there was placed an oil raffinate solution containing 0.217 mole of O-methyl polybutene(1100 m.w.) thiophosphonic acid as prepared in Example II. To the oil raffinate there was added 0.22 mole hydrazine hydrate ($NH_2NH_2 \cdot H_2O$) and 120 mls. dry toluene. The mixture was refluxed for 12 hours and stripped to 100° C. at 0.25 mm. Hg. At the end of the reaction period the product was analyzed and found to be an oil solution of a mixture of hydrazinium salts of the formulas:

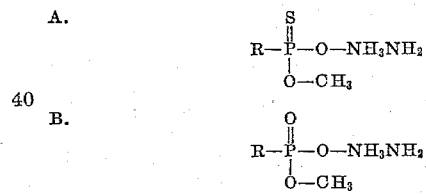

with Product A predominating. R in the above formula is a polybutene radical having an average molecular weight of about 1100. The hydrazinium product solution analyzed as follows:

| Desctiption | Calculated ¹ | Found |
| --- | --- | --- |
| Phosphorus, wt. percent | 1.17 | 1.18 |
| Sulfur, wt. percent | 1 | 0.38 |
| Nitrogen, wt. percent | 1.09 | 0.38 |
| Neut. No | | 22.4 |

¹ Based on thiophosphonate product being 100% Product A above.

I claim:

1. A hydrazinium hydrocarbonthiophosphonate of the formula:

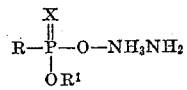

where R is hydrocarbon derived from an aliphatic polymonoolefin having an average molecular weight between 250 and 50,000 and $R^1$ is a member selected from the group consisting of hydrogen and alkyl of 1 to 10 carbons and X is a chalcogen selected from the group consisting of sulfur and a mixture of sulfur and oxygen.

2. A thiophosphonate in accordance with claim 1 wherein X is a mixture of sulfur and oxygen.

3. A hydrocarbonthiophosphonate in accordance with claim 1 wherin R is polybutene of an average molecular weight of about 1100 and $R^1$ is hydrogen and X is a mixture of sulfur and oxygen.

4. A thiophosphonate in accordance with claim 1 where R is polybutene of an average molecular weight of about 1100 and $R^1$ is methyl and X is a mixture of sulfur and oxygen.

5. A method of preparing a hydrazinium hydrocarbon-thiophosphonate comprising:
   (a) reacting $P_2S_5$ with an aliphatic poly-monoolefin hydrocarbon having an average molecular weight between 250 and 50,000 at a temperature between about 100 and 320° C. in a non-oxidizing atmosphere, the $P_2S_5$ constituting between 5 and 40% of the reaction mixture,
   (b) contacting the resultant $P_2S_5$-aliphatic poly-monoolefin hydrocarbon reaction mixture with steam at a temperature between about 100 and 260° C. and removing formed inorganic phosphorus acid from the steam treated reaction mixture,
   (c) contacting the resultant inorganic phosphorus acid removed, steam treated reaction mixture with a trialkyl phosphite of the formula $(R''O)_3P$ where $R''$ is an alkyl of from 1 to 10 carbons at a temperature between about 100 and 250° C.,
   (d) contacting the resultant trialkyl phosphite reacted, inorganic phosphorus acid removed, steam treated reaction mixture with hydrazine at a temperature between about 20 and 120° C. in a mole ratio of trialkyl phosphite reacted reaction mixture to hydrazine of between about 0.5:1 and 5:1.

References Cited by the Examiner

UNITED STATES PATENTS

| | | | |
|---|---|---|---|
| 2,202,124 | 5/1940 | Tattersall | 260—461.313 XR |
| 2,252,984 | 8/1941 | Rutherford et al. | 260—461.110 XR |
| 2,346,153 | 4/1944 | Denison et al. | 260—461.113 XR |
| 2,954,394 | 9/1960 | Blair et al. | 260—461.113 |
| 2,966,462 | 12/1960 | Spindt et al. | 260—461.113 XR |
| 3,087,956 | 4/1963 | Lacoste | 260—953 |

OTHER REFERENCES

Aaron et al., "J. Am. Chem. Soc.," vol. 80, pp. 107–110 (1958).

CHARLES B. PARKER, *Primary Examiner*.

IRVING MARCUS, *Examiner*.

FRANK M. SIKORA, *Assistant Examiner*.